April 22, 1969   J. C. STILES   3,439,961
BIFLUID HYDRODYNAMIC BEARING
Filed April 7, 1967

INVENTOR.
JOHN C. STILES
BY Constantine A. Michalos
ATTORNEY

United States Patent Office
3,439,961
Patented Apr. 22, 1969

3,439,961
BIFLUID HYDRODYNAMIC BEARING
John C. Stiles, Mountain Lakes, N.J., assignor to Singer-General Precision, Inc., a corporation of Delaware
Filed Apr. 7, 1967, Ser. No. 629,255
Int. Cl. F16c 7/04, 35/00, 1/24
U.S. Cl. 308—9      6 Claims

ABSTRACT OF THE DISCLOSURE

A high-speed bifluid hydrodynamic bearing for use on the spin axis of a flexure support free rotor gyro having a central portion filled with a nonwetting or a poor wetting liquid such as mercury, contained between the rotor and the housing of the bearing, and nonwetting rings axially spaced and supported at each end of the bearing by the rotor and the housing, thereby trapping the mercury in the bearing cavity. One purpose of the invention is to allow one end of the shaft to operate in a partial vacuum while the other end is supported by the second part of the bearing which uses a gas, such as air, and thereby producing the second fluid of the bifluid hydrodynamic bearing. In addition, scavenger grooves are machined at each of said ends into the shaft of the bearing to collect any fluid squeezed out of the radial high pressure side of the gyro and return it to the radial low pressure side when the rotor is radially offset from the axial center line of the gyro. Furthermore, a series of herringbone grooves are cut in either the shaft or the housing to again provide for means of impelling the fluid towards the center of the bearing to further reduce any leakage under load. A second approach to this invention is the use of a "ferromagnetic fluid" as the bearing lubricant. This comprises a carrier fluid having larger number of finely divided ferromagnetic particles, such as ferrite disposed in the carrier fluid which fluid has a low vapor pressure and a viscosity suitable for bearing operation. These particles, within the fluid as a whole, maintain its newtonian characteristics. The particles are attracted by a magnetic field so that the fluid may be maintained within the bearing cavity and not leak out from the ends. In addition, the attractive magnetic force would increase the effective pressure in the fluid, thus, in effect, partially floating the shaft, even when the shaft is not rotating.

BACKGROUND OF THE INVENTION

Field of the invention

This invention relates generally to bearings and more particularly to a high-speed bifluid hydrodynamic bearing for use on the spin axis of a flexure supported free rotor gyro.

Description of the prior art

Heretofore, it has been the practice to use ball bearings or fluid lubricated journal bearings. Ball bearings have certain drawbacks. Because of irregularities, they produce vibrations at harmonics of the spin frequency. Such vibrations can be a serious source of drift in the gyro. In addition, their life is limited by wear, metal fatigue, and loss of lubricant. Fluid-lubricated bearings required a supply of fluid to compensate for any loss of the lubricant due to leakage. The external supply of liquid is impractical in many gyro applications.

SUMMARY

It is the purpose of this invention to overcome the problems of ball bearing and fluid type bearings by providing a bifluid hydrodynamic bearing which is lubricated partially with a liquid and partially with a gas, such as air.

It is, therefore, an object of this invention to provide a bifluid hydrodynamic bearing allowing the gyro rotor to operate in a partial vacuum for avoiding error torques associated with windage.

Another object of this invention is to provide a bifluid bearing for a gyro rotor which bearing may be of a small diameter and, at the same time, operably developing adequate stiffness in the thrust direction.

A further object of this invention is to provide a bearing which can keep the liquid used in the lubrication in place without recourse to external supplies of liquid.

An additional object of this invention is to provide a liquid type of bearing, such as mercury, having poor wetting characteristics in combination with nonwetting rings to keep the mercury confined within the bearing cavity.

Still another object of this invention is to provide a bifluid bearing having means of trapping the fluid within the bearing cavity and having scavenger means for collecting any fluid squeezed out of the radial high pressure side of the bearing for returning it to the radial low pressure side of the bearing.

One further object of this invention is to provide a means of continuously impelling the fluid used as a bearing towards the axial center of the bearing cavity so as to reduce any leakage under load.

Still one more object of this invention is to provide a ferromagnetic fluid as a bearing lubricant and means of magnetizing and holding said ferro material suspended within the fluid for providing a suitable carrier fluid having a low vapor pressure and a viscosity suitable for bearing operation.

Other objects and many additional advantages of the invention will be more readily understood by those skilled in the art after a detailed consideration of the following specification taken with the accompanying drawing.

Figure 1:
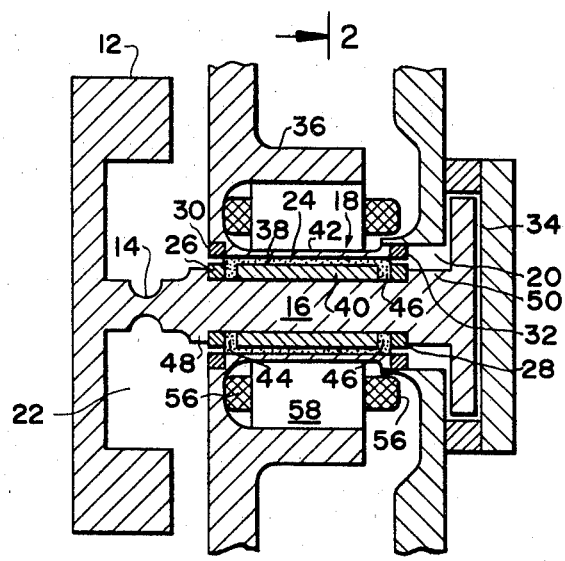
FIGURE 1 is a side sectional view of the bifluid hydrodynamic bearing in accordance with a preferred embodiment of this invention.
Figure 2:
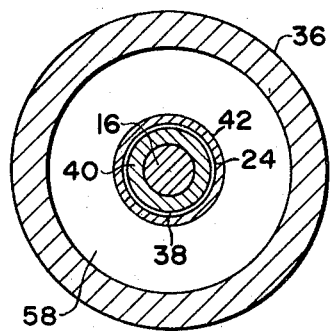
FIGURE 2 is a sectional view taken substantially along line 2—2 of FIGURE 1; and, FIGURE 3 is an enlarged fragmentary sectional view of the device shown in FIGURE 1.

Referring to the drawing of FIGURE 1, there is shown a gyro rotor 12 supported by a flexure joint assembly 14 through a shaft 16 which in turn is supported by a bifluid hydrodynamic bearing 18, in accordance with a preferred embodiment of this invention. The bearing 18 comprises hydrodynamic means for preventing gas from escaping from a high pressure chamber 20 of the gyro to the low pressure chamber 22, in which the rotor 12 rotates. Such means of preventing the flow through the hydrodynamic bearing 18 have been impractical for many applications in the past, because the bearings had to be made of a very small diameter. Because of their small size, they were not able to develop adequate stiffness in the thrust direction. This problem is overcome by providing a separate gas lubricated bearing. The gas bearing 18 can operate at reasonable power levels, because of the low viscosity of the gases as compared to liquids. The presence of the liquid bearing prevents the gas from passing into the low pressure chamber 22 occupied by the rotor 12 and flex joint assembly 14, thus permitting partial vacuum operation in this chamber 22.

The principal feature of this invention is the use of two fluids for lubricating the bearing 18. Part of the bearing is lubricated with a liquid 24, such as mercury, which is kept in place by the fact that it has a poor wetting characteristic and the use of nonwetting rings 26, 28, 30 and 32, made of material such as "Teflon." Part of the bearing is lubricated by gas, such as air 34, within the high pressure chamber 20. The air 34 within the high pressure chamber 20 operates as an air bearing for providing with the liquid 24 the one all bifluid bearing 18.

The rings 26, 28, and 30, 32 are attached to a housing 36 and to the shaft 16 respectively, of the bearing 18, in such a way as to trap the liquid 24 within a bearing cavity 38. The rings 26 and 28 are axially spaced and supported by the shaft 16 between a rotor bearing element 40. The rings 30 and 32 are axially spaced and supported by a house bearing element 42.

Figure 3:
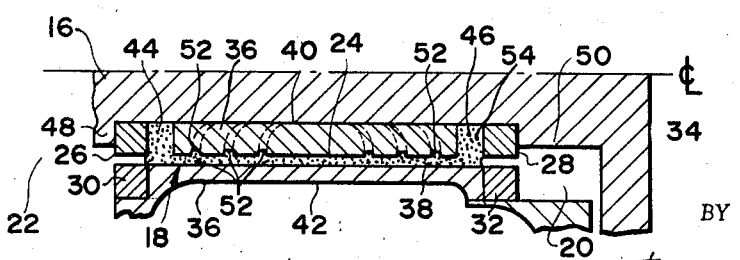

In addition, as shown in FIGURE 1, scavenger grooves 44 and 46 are formed by the axial spacing of end rings 48 and 50 on the shaft 16 of the rotor 34 supporting the rings 26 and 28, and spaced at either end from the rotor bearing element 40 to collect any fluid squeezed out of the radial high pressure side and return it to the radial low pressure side of the bearing 18 when the bearing is rotating eccentrically. As shown in FIGURE 3, in addition, a series of herring-bone grooves 52 are cut in the rotor bearing element 40, to impel the fluid 24 towards the center of the bearing cavity 38 so as to further reduce any leakage under load.

As schematically shown in FIGURE 3, a second approach to the solution of the problem is provided by the use of a ferro-magnetic fluid as the bearing lubricant. This fluid is comprised of a large number of finely divided ferromagnetic particles of ferrites 54 disposed in the carrier fluid 24 which usually, in this case, can be chosen to have a low vapor pressure and a viscosity suitable for bearing operation. When these particles 54 are made sufficiently small, approximately 75 angstrom units, the fluid as a whole maintains its newtonian characteristics, but is attracted by magnetic fields. These magnetic fields can be produced by coils 56, shown in FIGURE 1 through a motor stator 58. In this invention, the rotor, comprised of the shaft and the rotor element 40 of the bearing 18 is also the hysteresis ring which forms the rotor of a hysteresis synchronous drive motor having stator 58. The ring can be kept permanently magnetized so that the fluid under all conditions is attracted to the bearing cavity 38 and thus there would be no gas leakage in an axial direction through the mercury liquid 24 from the high pressure side 20 to the low pressure side 22. In other words, the magnetic attractive force of the coil 56 increases the effective pressure in the liquid 24, thus, in effect, partially floating the shaft 16 even when the shaft 16 is in a stationary position.

Therefore, in summary, the advantage of this invention is the use of a bearing which is quiet running and free from self-induced vibrations. This bearing permits vacuum operation of the rotor assembly by preventing the passage of gas from the high pressure side on the air bearing or other gas sources such as the motor stator gas, into the rotor chamber. Furthermore, the bearing of this invention cannot wear out, since there is no mechanical contact between the shaft and the housing. The hydrodynamic bearing can be used by having both liquid and gaseous elements whereby the liquid may be used as a lubricated bearing having lubricant loss prevented by surface tension effects. Finally, this hydrodynamic bearing can have a fluid with magnetic attracted particles which prevent loss of any lubricant material and in addition have an overall sealing efficiency against the axial passage of gas through the fluid from the high pressure side to the low pressure side.

What is claimed is:

1. A hydrodynamic bearing for a free rotor gyro, comprising an inner bearing element; an outer bearing element, coaxial with said inner bearing element and spaced therefrom to provide a bearing cavity; a fluid lubricant supported therebetween, having poor wetting characteristics; and, axially-spaced nonwettable means attached to said inner and said outer bearing elements at the ends of the bearing cavity for trapping said fluid within the bearing cavity.

2. The structure of claim 1, wherein said fluid is a mercury compound and said nonwetting means are nonwetting rings made of "Teflon" radially-spaced from each other and supported by both the internal and external bearing elements.

3. The structure of claim 1, further comprising ferrous particles suspended in said fluid and magnetic means operably attracting said ferrous material producing a suspension of said material within said fluid and thereby providing further holding means for holding said fluid within the bearing cavity.

4. The structure of claim 2, further comprising a shaft supporting said inner bearing element; and said inner bearing element further having a herring-bone grooves circumferentially on the outside surface of said inner bearing element, and directed in a direction towards the center portion of said inner bearing element for impelling the fluid towards the center of the bearing so as to reduce any leakage under load.

5. The structure of claim 1, further providing a pair of scavenger grooves circumferentially extending around the outer circumference of said inner bearing element for producing collecting means for collecting any fluid squeezed out of the high pressure side of the bearing and returning it to the low pressure side of the bearing when said inner bearing element is rotating radially offset from the central axis of said outer bearing element.

6. The structure of claim 2, further comprising a shaft supporting said inner bearing element, interposed between and axially-spaced from each of the wetting rings and thereby providing end scavenger grooves for collecting any fluid squeezed out of the radial high pressure side and returning it to the radial low pressure side of the bearing when said inner bearing element is rotating radially offset from the central axis of said outer bearing element, and a pair of chambers, a low pressure chamber supporting the gyro rotor of the free rotor gyro for rotation therein at one end of the shaft; and a high pressure chamber operably supporting the rotor of the gyro at the other end of the shaft for assisting the bearing function of the hydrodynamic bearing and thereby providing for a bifluid bearing support for supporting rotation of said gyro rotor.

References Cited

UNITED STATES PATENTS

| | | | |
|---|---|---|---|
| 2,810,291 | 10/1957 | Bishop et al. | 310—90 X |
| 3,080,703 | 3/1963 | Body | 308—159 X |
| 3,224,296 | 12/1965 | Civelli | 308—122 X |

CARROLL B. DORITY, JR., *Primary Examiner.*

U.S. Cl. X.R.

192—21.5; 308—122